United States Patent [19]
Horikawa et al.

[11] Patent Number: 6,047,329
[45] Date of Patent: Apr. 4, 2000

[54] NON-BROADCAST MULTI-ACCESS NETWORK SYSTEM CAPABLE OF CARRYING OUT TRANSMISSION OF A NEXT HOP RESOLUTION PROTOCOL PACKET WITHOUT SETTING INTERNET PROTOCOL ADDRESSES

[75] Inventors: Koichi Horikawa; Atsushi Iwata, both of Tokyo, Japan

[73] Assignee: NEC Corporation, Japan

[21] Appl. No.: 08/911,335

[22] Filed: Aug. 14, 1997

[30] Foreign Application Priority Data

Aug. 15, 1996 [JP] Japan ................................. 8-215748

[51] Int. Cl.[7] .................................................. H04L 12/56
[52] U.S. Cl. .......................... 709/238; 709/228; 370/396; 370/397
[58] Field of Search ........................ 395/200.68, 200.58; 370/396, 397, 401; 709/228, 238

[56] References Cited

U.S. PATENT DOCUMENTS

| | | | |
|---|---|---|---|
| 5,583,862 | 12/1996 | Callon | 370/397 |
| 5,809,233 | 9/1998 | Shur | 395/200.6 |
| 5,822,320 | 10/1998 | Horikawa et al. | 370/396 |
| 5,828,544 | 10/1998 | Civanlar et al. | 395/200.58 |

*Primary Examiner*—Moustafa M. Meky
*Assistant Examiner*—Abdullahi E. Salad
*Attorney, Agent, or Firm*—Ostrolenk, Faber, Gerb & Soffen LLP

[57] ABSTRACT

A non-broadcast multi-access network system comprises a plurality of network servers at least a specific one of which servers employs Next Hop Resolution Protocol for converting a network layer address into a corresponding data link layer address. The specific network server comprises a routing table access section (102) for accessing a routing table to refer to the routing table representative of a routing of a network layer. An NHRP server table (103) stores server address information of at least a particular one of the network servers and network layer address information of the network layer managed by the particular network server as an address set. An NHRP server processing section (101) is supplied with a Next Hop Resolution Protocol packet having a destination network layer address for accessing the NHRP server table to judge whether or not the destination network layer address exists in the address set. The NHRP server processing section transmits the Next Hop Resolution Protocol packet to the particular network server when the destination network layer address exists in the address set. The NHRP server processing section controls the routing table access section to make the routing table access section refer to the routing table when the destination network layer address does not exist in the address set.

6 Claims, 4 Drawing Sheets

| 1st FIELD (SET OF IP ADDRESSES TO BE MANAGED) | 2nd FIELD (MANAGING NHS) |
|---|---|
|   |   |
|   |   |
| ⋮ | ⋮ |
|   |   |

FIG. 3

| 1st FIELD (SET OF IP ADDRESSES TO BE MANAGED) | 2nd FIELD (MANAGING NHS) |
|---|---|
| B. | B.2 (NHS-B) |

FIG. 4

| 1st FIELD (SET OF IP ADDRESSES TO BE MANAGED) | 2nd FIELD (MANAGING NHS) |
|---|---|
| C. | C.1 (NHS-B) |

FIG. 5

NON-BROADCAST MULTI-ACCESS NETWORK SYSTEM CAPABLE OF CARRYING OUT TRANSMISSION OF A NEXT HOP RESOLUTION PROTOCOL PACKET WITHOUT SETTING INTERNET PROTOCOL ADDRESSES

BACKGROUND OF THE INVENTION

This invention relates to a non-broadcast multi-access (NBMA) network system which employs Next Hop Resolution Protocol (NHRP), more particularly, to a system for the transmission of NHRP packets.

In general, Next Hop Resolution Protocol (NHRP) is used as an address resolution protocol in a non-broadcast multi-access (NBMA) network and has been discussed in the Internet Engineering Task Force (IETF). The specifications of the NHRP may be, for example, written in draft-ietf-rolc-NHRP-08.txt.

A description of NHRP will be made hereinunder. It will be assumed that an ATM network is used as the NBMA network and that the Internet Protocol (IP) is used as a higher-level protocol although the same discussion applies even when other types of NBMA network and network layer protocol are employed.

In order to perform IP communications over the ATM network, it is necessary to acquire an ATM address from the IP address of a recipient. An NHRP server (NHS) is provided in each individual area (for example, logical IP subnet, or LIS). The NHRP server locally manages data on combinations of IP addresses and ATM addresses of individual ATM stations connected to the ATM network in the NHRP.

In a case where an ATM station discovers an ATM address that corresponds to the IP address of a specific recipient, the ATM station transmits an NHRP address resolution request packet to a predetermined NHS. Upon receiving the NHRP address resolution request packet, the predetermined NHS returns an NHRP address resolution reply packet to the ATM station when it is possible to determine the requested ATM address. When it is impossible for the predetermined NHS to determine the requested ATM address, the predetermined NHS transfers the NHRP address resolution request packet to another NHS which is supposed to have address conversion data on the relevant IP address. This means that the NHRP address resolution request packet is transferred from one NHS to another until it reaches an NHS which can perform the requested address resolution operation.

It is therefore possible to discover the ATM address of the recipient when it is directly connected to the ATM network, even if the recipient belongs to a different LIS. In case where the recipient is not directly connected to the ATM network, it is possible to provide the ATM address of an exit router (gateway) of the ATM network.

Each NHS determines whether it should process a received NHRP packet depending on whether it is the very NHS which is assigned to manage the destination of the relevant packet. The received NHRP packet may be, for example, the aforementioned NHRP address resolution request packet. The destination would be an IP address to be resolved when the received packet is an NHRP address resolution request packet. The destination would be an IP address to be registered when the received packet is an NHRP registration request packet. The destination would be an IP address designated in a destination IP address field of the NHRP packet when the received packet is other than the NHRP address resolution request and NHRP registration request packets. It is stipulated that the NHS must determine to which other NHS the received NHRP packet should be transferred by reference to an IP routing table stored in the NHS if it judges that it is not assigned to process the received NHRP packet.

Conventional rules for NHRP packet transfer under the NHRP have been associated with a problem, namely that has been required to register IP addresses to be managed by each individual NHS. Each NHS performs NHRP packet transfer operation referring to an IP routing table. Another problem is that it is not possible to transfer an NHRP packet to the right NHS which manages a relevant LIS only by referring to the IP routing table if a plurality of NHS's belong to a specific LIS and it is desired to assign only one of these NHS's to manage address information of that LIS.

SUMMARY OF THE INVENTION

It is therefore an object of the invention to provide a non-broadcast multi-access network system which eliminates the need for setting or registering IP addresses managed by each NHS.

Another object of the invention is to provide a non-broadcast multi-access network system which can transfer an NHRP packet to the right NHS which manages a relevant LIS even when a plurality of NHS's belong to the LIS and it is desired to assign only one of these NHS's to manage address information of that LIS.

On describing the gist of this invention, it is possible to understand that a non-broadcast multi-access network system comprises a plurality of network servers and at least a specific one of the network servers employs Next Hop Resolution Protocol for converting a network layer address into a corresponding data link layer address.

According to this invention, the specific network server comprises first means for referring to a routing table representative of a routing of a network layer, second means for storing server address information of at least a particular one of the network servers and network layer address information of the network layer managed by the particular network server as an address set, and third means supplied with a Next Hop Resolution Protocol packet having a destination network layer address for accessing the second means to judge whether or not the destination network layer address exists in the address set, the third means transmitting the Next Hop Resolution Protocol packet to the particular network server when the destination network layer address exists in the address set.

BRIEF DESCRIPTION OF THE DRAWING

FIGS. 3 to 5 are views for describing next hop resolution protocol server table illustrated in FIG. 2.

DESCRIPTION OF THE PREFERRED EMBODIMENT

Figure 1:
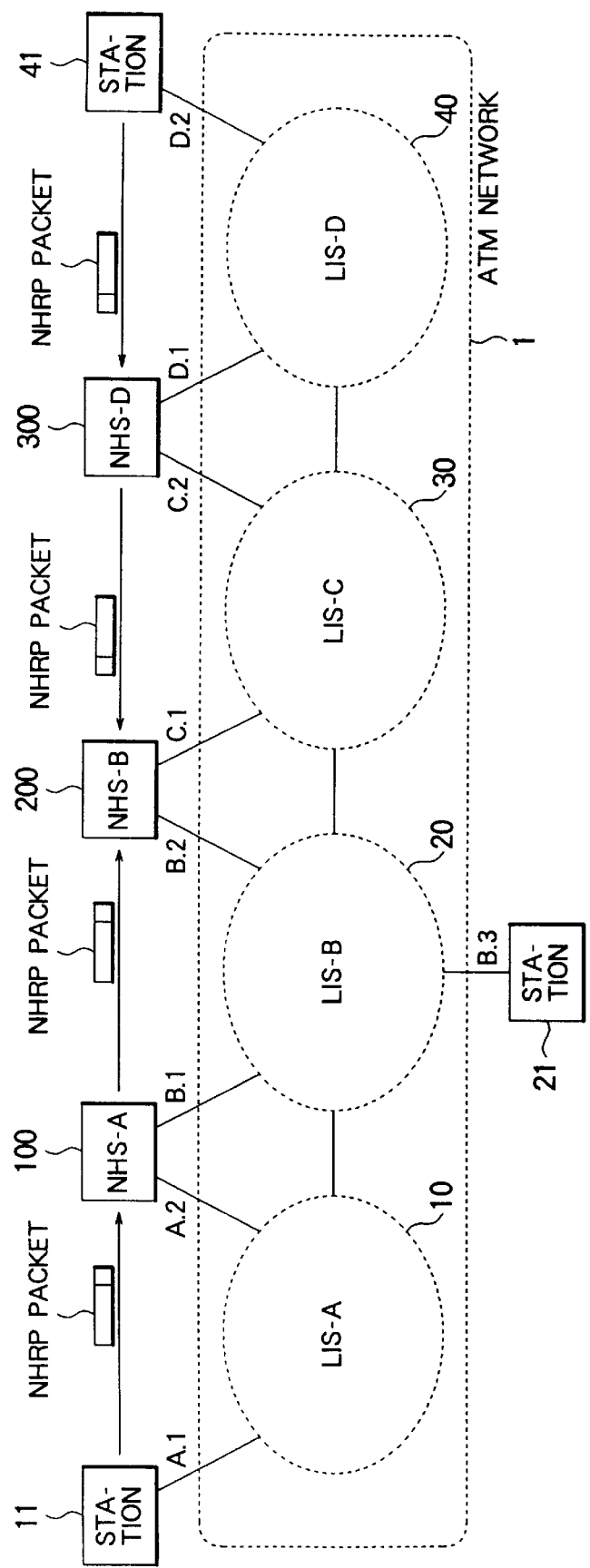
FIG. 1 is a block diagram of a network comprising a next hop resolution protocol server according to a preferred embodiment of this invention.

Referring to FIG. 1, description will proceed to a non-broadcast multi-access (NBMA) network according to a preferred embodiment of this invention. Although an asynchrous transfer mode (ATM) network is used as the non-broadcast multi-access (NBMA) network and an internet protocol (IP) is used as a higher-level protocol for the convenience of explanation, other types of NBMA network and network layer protocol are employed in a similar manner.

It will assumed that a plurality of logical internet protocol subnets (LIS's) are defined in an ATM network 1. In the example being illustrated, LIS 10 (LIS-A), LIS 20 (LIS-B), LIS 30 (LIS-C), and LIS 40 (LIS-D) are defined in the ATM network 1. Terminal stations 11, 21, and 41 are directly connected to the ATM network 1. The terminal stations 11 and 41 can set up switched virtual connections (SVC's) each other on an ATM level. ATM switches are not illustrated in FIG. 1. No illustration will be made about interconnecting lines and some other elements that form part of the ATM network 1 with a few exceptions.

A next hop resolution protocol server 100 (NHS-A) belongs to both of the LIS 10 and the LIS 20. The NHS 100 has interfaces which are assigned IP (internet protocol) addresses A.2 and B.1, respectively. Similarly, an NHS 200 belongs to both of the LIS 20 and the LIS 30. The NHS 200 has interfaces which are assigned IP addresses B.2 and C.1, respectively. An NHS 300 belongs to both of the LIS 30 and the LIS 40. The NHS 300 has interfaces which are assigned IP addresses C.2 and D.1, respectively. The terminal stations 11, 21, and 41 belong to the LIS 10, LIS 20, and LIS 40, respectively. The terminal stations 11, 21, and 41 have interfaces which are assigned IP addresses A.1, B.3, and D.2, respectively. In the example being illustrated, each of the letters A to D represents a subnet number of an IP address.

It will be assumed that the NHS 100 manages the LIS 10 and that the NHS 200 manages the LIS 20 and the LIS 30. Furthermore, it will be assumed that the NHS 300 manages the LIS 40.

Figure 2:
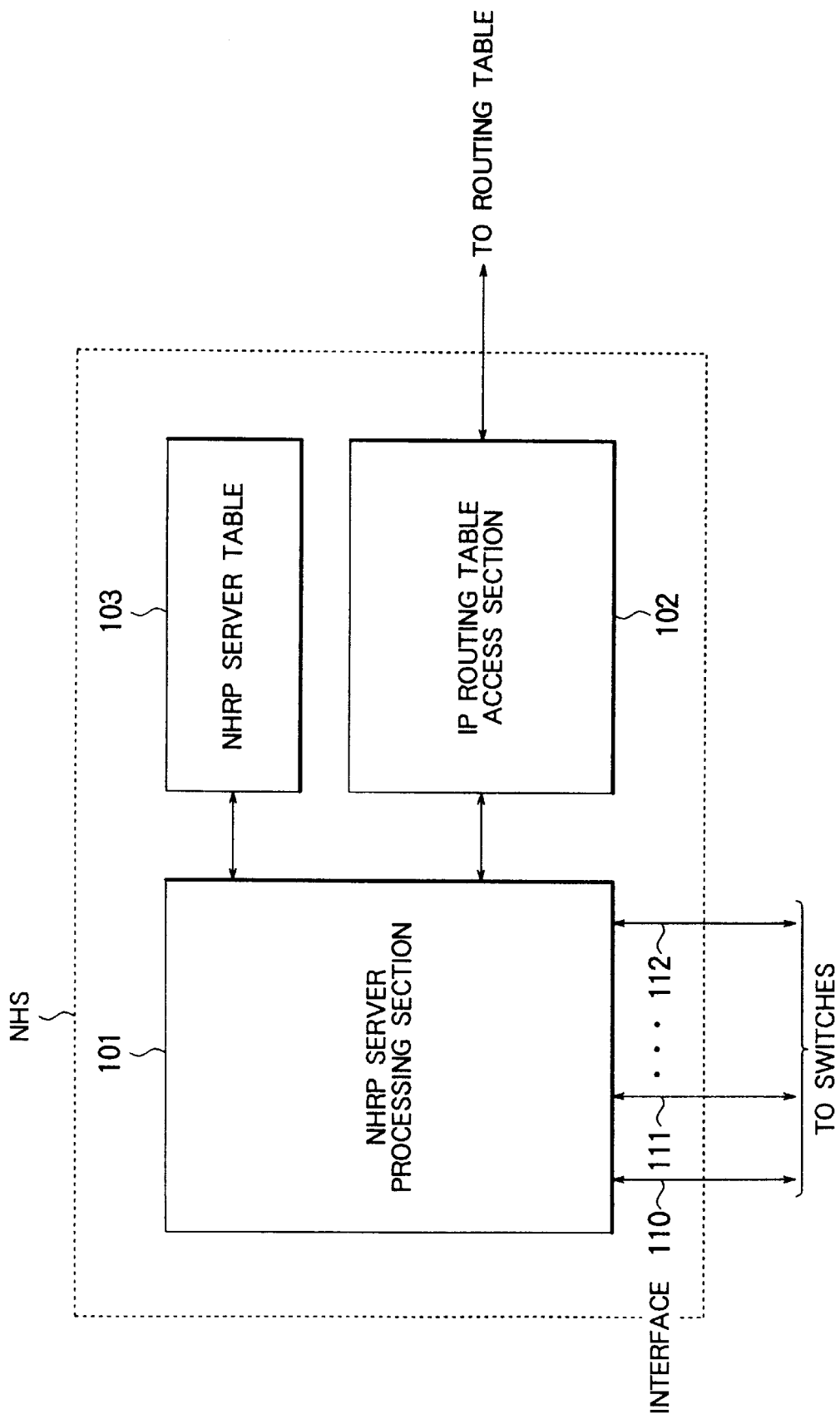
FIG. 2 is a block diagram of the next hop resolution protocol server illustrated in FIG. 1.

Referring to FIG. 2, the NHS 100 comprises an NHRP server processing section 101, an IP routing table access section 102, and an NHRP server table 103. The NHRP server processing section 101 has a plurality of interfaces 110 to 112 for establishing connections to the LIS 10 and the LIS 20. The interfaces 110 to 112 are connected to the respective ATM switches of the ATM network 1 illustrated in FIG. 1. Each of the NHS 200 and NHS 300 is similar in structure to the NHS 100.

The IP routing table access section 102 is connected to the NHRP server processing section 101. When the NHRP server processing section 101 supplies the IP routing table access section 102 with a routing table reference request, the IP routing table access section 102 accesses an IP routing table (not shown) in response to the routing table reference request to supply a routing reference result to the NHRP server processing section 101. Although the IP routing table is not illustrated in FIG. 1, the IP routing table may be provided in the NHS 100.

The routing reference result is representative of the content of the IP routing table. In the example being illustrated, the content of the IP routing table is determined so as to properly represent the network configuration illustrated in FIG. 1. The contents of the IP routing table may dynamically be set in the IP routing table by using a readily available IP routing protocol, such as the routing information protocol (RIP) or the open shortest path first (OSPF) protocol. The contents of the IP routing table may be statically set in the IP routing table by a network administrator. During a predetermined time duration, the IP routing table access section 102 may cache the content of the IP routing table that is referred to once, in order to carry out high-speed routing operation.

The NHRP server table 103 is connected to the NHRP server processing section 101. The NHRP server processing section 101 accesses NHRP server table 103 to read the data content out of the NHRP server table 103. The NHRP server table 103 has a configuration shown in FIG. 3. At each entry, the NHRP server table 103 has a first field named "set of IP addresses to be managed" and a second field named "managing NHS". More particularly, the first field stores subnet numbers each of which is for use in distinguishing LIS's. Each of the subnet numbers may be called LIS.

A subnet number may be designated by a combination of an IP address and a subnet mask which determines how many higher-order bits of the IP address are used to express the subnet number.

The IP address of the relevant NHS is written in the second field. The network administrator may preset an ATM address corresponding to the IP address of the NHS in a file. Alternatively, there may be provided an acquiring section for acquiring the ATM address corresponding to the IP address. No description is made about the acquiring section in this embodiment since the acquiring section is not included in the scope of this invention.

It will be assumed that a particular NHS belongs a plurality of LIS's. When the particular NHS does not manage a specific one of the LIS's, the NHRP server table 103 stores the specific LIS and the IP address of another NHS which actually manages the specific LIS. Accordingly, it is not necessary to enter any data into the NHRP server table 103 if the particular NHS manages all LIS's to which the particular NHS belongs.

Referring to FIG. 4 in addition to FIG. 1, FIG. 4 shows the NHRP server table 103 of the NHS 100. In the example being illustrated, the NHS 100 does not manage the LIS 20 although the NHS 100 belongs to the LIS 20. In this case, the NHRP server table 103 of the NHS 100 stores the entry indicating that the NHS 200 (NHS-B) manages the LIS 20 (LIS-B) as shown in FIG. 4. Similarly, FIG. 5 shows the NHRP server table 103 of the NHS 300. The NHS 300 does not manage the LIS 30 although the NHS 300 belongs to the LIS 30. The NHRP server table 103 of the NHS 300 stores the entry indicating that the NHS 200 (NHS-B) manages the LIS 30 (LIS-C) as shown in FIG. 5.

Each of the IP routing table access section 102 and the NHRP server table 103 shown in FIG. 2 may be configured either with hardware, such as a random-access-memory (RAM) or with software.

Figure 6:
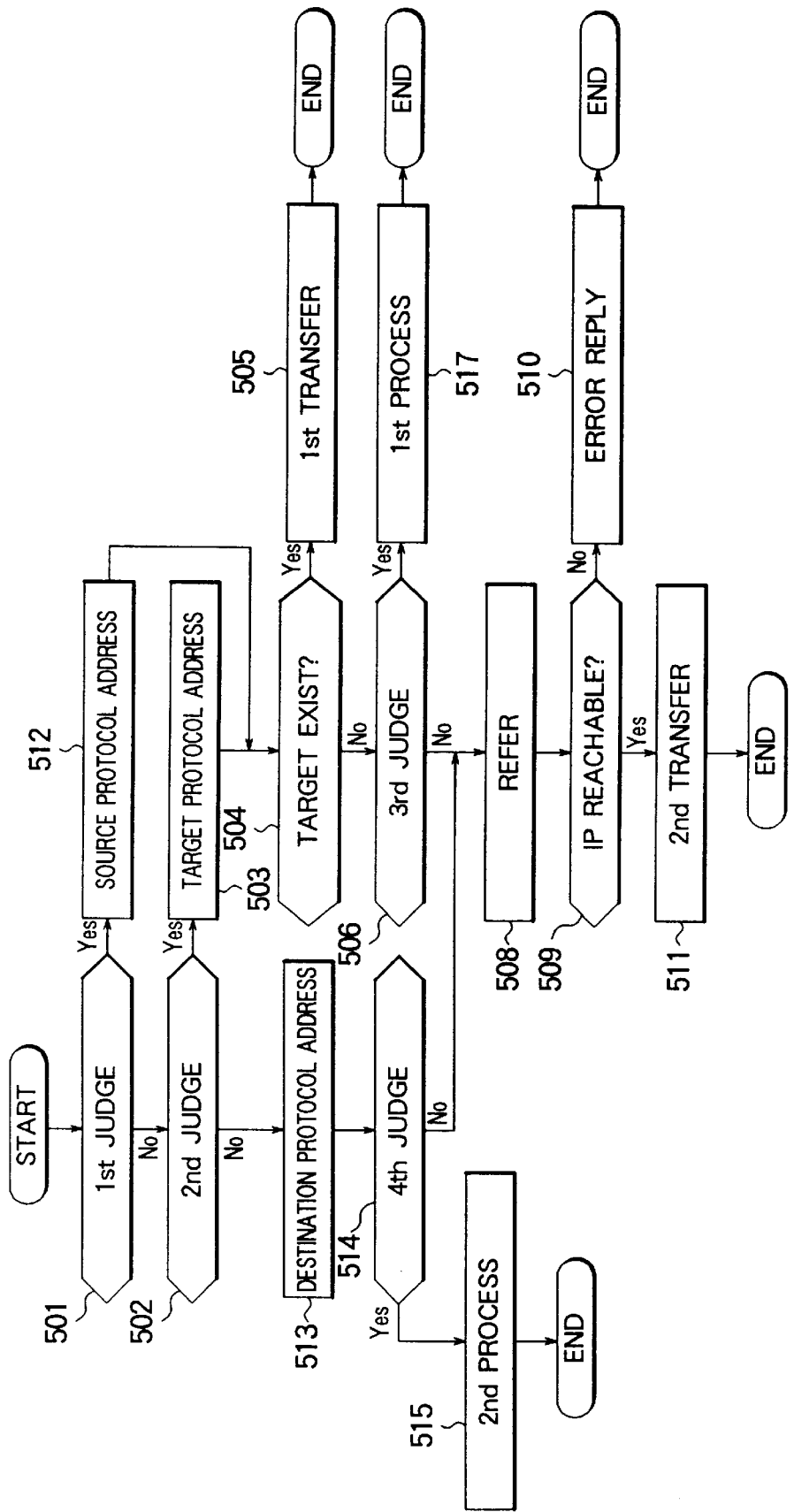
FIG. 6 is a flowchart for describing an operation of the network illustrated in FIG. 1.

Referring to FIG. 6 together with FIG. 1, the description will proceed to an operation of an NHS. It will be assumed that the terminal station 11 transmits an NHRP address resolution request packet to the NHS 100 in order to discover the address of the terminal station 21.

On receiving NHRP address resolution request packet as a received NHRP packet, the NHS 100 judges whether or not the received NHRP packet is an NHRP address registration request packet at a first step 501 labelled "1st JUDGE". Inasmuch as the received NHRP packet is not the NHRP address registration request packet, the first step 501 is followed by a second step 502 labelled "2nd JUDGE". At second step 502, the NHS 100 judges whether or not the received NHRP packet is the NHRP address resolution request packet. Inasmuch as the received NHRP packet is the NHRP address resolution request packet, the NHS 100 sets the IP address written in a Target Protocol Address field of the NHRP address resolution request packet as a target at a third step 503 labelled "Target Protocol Address".

The third step 503 is followed by a fourth step 504 labelled "Target Exist?". At the fourth step 504, the NHS 100 checks whether or not the above-mentioned target exists in the first field of the relevant NHRP server table 103. As described in conjunction with FIG. 4, the NHRP server table 103 of the NHS 100 stores information indicating that the LIS 20 (LIS-B) is managed by the NHS 200 (NHS-B). At a fifth step 505 labelled "1st TRANSFER", the NHS 100 transmits or transfers the NHRP address resolution request packet to the NHS 200 whose IP address is B.2.

On receiving the NHRP address resolution request packet, the NHS 200 carries out the first through fourth steps 501 to 504 as readily understood from the above description.

Inasmuch as the NHS 200 has no entry in its NHRP server table, the NHS 200 judges whether or not the target belongs to one of subnets to which the NHS 200 belongs, at a sixth step labelled "3rd JUDGE". Inasmuch as the NHS 200 has the interface for the LIS 20, the NHS 200 processes the NHRP address resolution request packet in a known manner at a seventh step 517 labelled "1st PROCESS".

Again referring to FIG. 6 in addition to FIG. 1, it will be assumed that terminal station 41 transmits an NHRP address resolution request packet to the NHS 300 in order to discover the address of the terminal station 21.

On receiving NHRP address resolution request packet as the received NHRP packet, the NHS 300 judges whether or not the received NHRP packet is the NHRP address registration request packet at the first step 501. Inasmuch as the received NHRP packet is not the NHRP address registration request packet, the NHS 300 judges whether or not the received NHRP packet is the NHRP address resolution request packet at the second step 502. Inasmuch as the received NHRP packet is the NHRP address resolution request packet, the NHS 300 sets the IP address written in a Target Protocol Address field of the NHRP address resolution request packet as the target at the third step 503.

At the fourth step 504, the NHS 300 checks whether or not the above-mentioned target exists in the first field of the relevant NHRP server table 103. As described in conjunction with FIG. 5, the NHS 300 has no entry in its NHRP server table 103. The NHS 300 judges whether or not the target belongs to one of subnets to which the NHS 300 belongs, at the sixth step 506. Inasmuch as the NHS 300 does not have the interface for the LIS 20 (LIS-B), the sixth step 506 is followed by an eighth step 508 labelled "REFER". At the eighth step 508, the NHRP server processing section 101 transmits a request to the IP routing table access section 102 in the NHS 300 in order to refer to the IP routing table (not shown).

The eighth step 508 followed by a ninth step 509 labelled "IP REACHABLE?". At the ninth step 509, the NHS 300 judges whether or not a route to the target exists in the IP routing table. When no route exits (When the target is not IP reachable), the NHS 300 replies an error (a negative reply or an NHRP error reply) to the terminal station 41 at a tenth step 510 labelled "ERROR REPLY". When the target is IP reachable, the NHS 300 transfers the NHRP address resolution request packet to a "Next Hop" (another NHS) in accordance with description of the IP routing table at an eleventh step 511 labelled "2nd TRANSFER". In the example being illustrated, the NHS 300 transfers the NHRP address resolution request packet to the NHS 200 at the eleventh step 511 inasmuch as the NHS 200 (whose IP address is C.1) is entered as the "next hop" for the LIS 20 in the IP routing table.

On receiving the NHRP address resolution request packet, the NHS 200 carries out the first through seventh steps as readily understood from the above description. The NHS 200 processes the NHRP address resolution request packet in a known manner at the seventh step 517.

It will be assumed next that the received NHRP packet is an NHRP address registration request packet. In this case, the first step 501 followed by a twelfth step 512 labelled "Source Protocol Address". At the twelfth step 512, the IP address written in a Source Protocol Address field of the NHRP address registration request packet is set as a target. The twelfth step 512 is followed by the fourth step 504.

It will be assumed that the received NHRP packet is neither the NHRP address resolution request packet nor the NHRP address registration request packet. Inasmuch as the received NHRP packet is not the NHRP address registration request packet, the first step 501 is followed by the second step 502 as described above. Inasmuch as the received NHRP packet is not the NHRP address resolution request packet, the second step 502 is followed by a thirteenth step 513 labelled "Destination Protocol Address". At the thirteenth step 513, the IP address written in a Destination Protocol Address field of the NHRP packet is set as a target. The thirteenth step 513 is followed by a fourteenth step 514 labelled "4th JUDGE". At the fourteenth step 514, the fourteenth step 514 is followed by a fifth step 515 labelled "2nd PROCESS", when the target is coincident with one of IP addresses of the NHS's own interfaces. At the fifteenth step 515, the relevant NHS processes the received NHRP packet in a known manner.

When the target is not coincident with any one of the NHD's IP addresses of the own interfaces at the fourteenth step 514, the fourteenth step 514 is followed by the eighth step 508.

As readily understood from the above description, it is not necessary to set IP addresses to be managed by each NHS because each NHS determines whether or not it should process a received NHRP packet based on an NHRP server table and address information of its own interfaces.

Inasmuch as each NHS determines whether or not it should process a received NHRP packet referring to the NHRP server table prior to an IP routing table and each NHS transfers the NHRP packet to another NHS entered in the NHRP server table when such an entry has been found, it is possible transfer an NHRP packet to the right NHS which manages a relevant LIS even when a plurality of NHS's belong to the LIS and it is desired to assign only one of these NHS's to manage address information of that LIS.

While this invention has thus far been described in conjunction with the preferred embodiment thereof, it will readily be possible for those skilled in the art to put this invention into practice in various other manners.

What is claimed is:

1. A non-broadcast multi-access network system comprising a plurality of network servers, at least a specific one of which employs Next Hop Resolution Protocol for converting a network layer address into a corresponding data link layer address, said specific network server comprising:

first means for referring to a routing table representative of a routing of a network layer;

second means for storing server address information of at least a particular one of said network servers and network layer address information of the network layer managed by said particular network server as an address set; and third means supplied with a Next Hop Resolution Protocol packet having a destination network layer address for accessing said second means to judge whether or not said destination network layer address exists in said address set, said third means transmitting said Next Hop Resolution Protocol packet to said particular network server when said destination network layer address exists in said address set.

2. A non-broadcast multi-access network system as claimed in claim 1, wherein said third means controls said first means to make said first means refer to said routing table when said destination network layer address does not exist in said address set.

3. A non-broadcast multi-access network system as claimed in claim 1, each of said specific and said particular network servers belonging to at least one network layer, wherein:

said server address information is representative of server address of said particular network server which manages the network layer to which said specific network server belongs.

4. In a non-broadcast multi-access network system comprising a plurality of network servers, at least a specific one of which employs Next Hop Resolution Protocol for converting a network layer address into a corresponding data link layer address, a method in said specific network server comprising the steps of:

referring to a routing table which is representative of a routing of a network layer;

storing server address information of a least a particular one of said network servers and network layer address information of the network layer managed by said particular network server as an address set;

supplying a Next Hop Resolution Protocol packet having a destination network layer address and judging whether or not said destination network layer address exists in said address set, and transmitting said Next Hop Resolution Protocol packet to said particular network server when said destination network layer address exists in said address set.

5. A method as claimed in claim 4, further comprising the step of referring to said routing table when said destination network layer address does not exist in said address set.

6. A method as claimed in claim 4, wherein each of said specific and said particular network servers belongs to at least one network layer, and wherein said server address information is representative of server address of said particular network server which manages the network layer to which said specific network server belongs.

* * * * *